(12) United States Patent
Winterot et al.

(10) Patent No.: US 9,429,740 B2
(45) Date of Patent: Aug. 30, 2016

(54) TELECENTRIC MODULAR ZOOM SYSTEM

(71) Applicant: Carl Zeiss Microscopy GmbH, Jena (DE)

(72) Inventors: Johannes Winterot, Jena (DE); Hans-Juergen Dobschal, Kleinromstedt (DE); David Shafer, Fairfield, CT (US)

(73) Assignee: CARL ZEISS MICROSCOPY GMBH, Jena (DE)

( * ) Notice: Subject to any disclaimer, the term of this patent is extended or adjusted under 35 U.S.C. 154(b) by 112 days.

(21) Appl. No.: 14/255,900

(22) Filed: Apr. 17, 2014

(65) Prior Publication Data

US 2014/0313589 A1 Oct. 23, 2014

(30) Foreign Application Priority Data

Apr. 19, 2013 (DE) .................... 10 2013 006 999

(51) Int. Cl.
*G02B 15/14* (2006.01)
*G02B 9/64* (2006.01)
(Continued)

(52) U.S. Cl.
CPC ............. *G02B 13/22* (2013.01); *G02B 21/025* (2013.01); *G02B 5/005* (2013.01); *G02B 7/14* (2013.01);
(Continued)

(58) Field of Classification Search
CPC .... G02B 15/14; G02B 15/20; G02B 13/009; G02B 15/177; G02B 13/0045; G02B 21/02; G02B 5/005; G02B 9/64; G02B 13/006; G02B 21/025; G02B 7/14; G02B 13/005; G02B 13/22; G02B 21/0032; G02B 21/008; G02B 21/361; G02B 21/002; G02B 27/4211; G03B 17/14; G03B 2205/0046; G03B 5/00

USPC ............... 359/663, 656–661, 672, 676, 679, 359/684–690, 738, 739, 827, 368, 379, 359/380–383
See application file for complete search history.

(56) References Cited

U.S. PATENT DOCUMENTS 6,292,306 B1 * 9/2001 Betensky ............... G02B 13/22
359/663

FOREIGN PATENT DOCUMENTS

GB  1 061 741  3/1967
WO  WO-2010/081678 A1  7/2010

OTHER PUBLICATIONS

Search Report, German Patent and Trademark Office, German Patent Application No. 10 2013 006 999.8, dated Jun. 26, 2013.

*Primary Examiner* — Evelyn A Lester
(74) *Attorney, Agent, or Firm* — Nixon Peabody LLP; Jeffrey L. Costellia (57) ABSTRACT

The invention relates to a telecentric modular zoom system for mapping an object plane on a sensor, in particular in a digital transmitted light microscope or incident light microscope having interchangeable lenses, comprising a fixed tube lens unit (LG1) and multiple optical assemblies (LG2, LG3, LG4, LG5, LG6), at least two of which are adjustably arranged relative to one another for the purpose of changing the magnification, characterized in that [sic]. According to the invention, a physical aperture (BL) conjugated relative to the rear focal points of the objectives used and having a variable diameter may be arranged in the beam path, wherein the rear focal points of the objective may be mapped in the space between a sensor image (BIE) and the intermediate image (ZB), the images of the rear focal points of the objectives (aperture BL) and the sensor image (BIE) do not lie within or migrate through the optical assemblies (LG2, LG3, LG4, LG5, LG6, LG7).

6 Claims, 8 Drawing Sheets

(51) Int. Cl.
*G02B 13/22* (2006.01)
*G02B 21/00* (2006.01)
*G02B 13/00* (2006.01)
*G02B 15/20* (2006.01)
*G02B 21/36* (2006.01)
*G02B 15/177* (2006.01)
*G02B 21/02* (2006.01)
*G03B 5/00* (2006.01)
*G02B 5/00* (2006.01)
*G02B 27/42* (2006.01)
*G02B 7/14* (2006.01)
*G03B 17/14* (2006.01)

(52) U.S. Cl.
CPC ............... *G02B 9/64* (2013.01); *G02B 13/005* (2013.01); *G02B 13/006* (2013.01); *G02B 13/009* (2013.01); *G02B 13/0045* (2013.01); *G02B 15/14* (2013.01); *G02B 15/177* (2013.01); *G02B 15/20* (2013.01); *G02B 21/002* (2013.01); *G02B 21/008* (2013.01); *G02B 21/0032* (2013.01); *G02B 21/02* (2013.01); *G02B 21/361* (2013.01); *G02B 27/4211* (2013.01); *G03B 5/00* (2013.01); *G03B 17/14* (2013.01); *G03B 2205/0046* (2013.01)

Figure 1

Magnification range: 10 x 0.5 - 5

Magnification Range: 10 x 0.5 - 5

Magnification Range: 10 x 0.5 - 5

Magnification Range: 10 x 0.5 - 5

Magnification Range: 10 x 0.5 - 5

Magnification range: 10 x 0.5 - 5

Magnification range: 8 x 0.4 - 3.2

Figure 16

TELECENTRIC MODULAR ZOOM SYSTEM

The present invention relates to a telecentric modular zoom system for mapping an object plane on a sensor, in particular in a digital transmitted light microscope or incident light microscope having interchangeable lenses, comprising a fixed tube lens unit and multiple optical assemblies, at least two of which are adjustable arranged relative to one another for the purpose of changing the magnification.

Digital microscopes are known per se. Unlike conventional light microscopes, the image of the sample being examined with digital microscope systems is not observed through an eyepiece, but rather is initially converted electro-optically using a digital image recording device and is visually reproduced again with the aid of an image display device—or the image content is evaluated electronically. In this arrangement, observation and evaluation are not tied to the place of image recording, but are instead freely selectable independently thereof owing to the possibility of transmitting electronic image signals. Thus, for example, an optimum adaptation to the physical constitution of an observer is possible just as is the transmission of an image over communication paths to multiple observation or evaluation locations, or the adaptation of the microscope to observational tasks that cannot be solved with conventional microscopes.

Telecentric zoom systems are used where variation in magnification is involved. In WO 2010/081678 A1, for example, a variable telecentric microscopy system is described in which at least one of the groups of lenses of the magnification system is adjustable along its optical axis, the position of the entry pupil remaining constant over the entire magnification range and being mapped at a physical location after the last mobile lens group. The drawback of this solution is the short infinite space between objective and zoom, which hampers coupling of the imaging light in this space and prevents the use of contrasts such as DIC in this space. Also desirable is a shortening of the overall transmission length.

Commercially available digital microscopes or microscope systems are constructively adapted to certain applications and are therefore generally unalterably designed as upright or inverted microscopes. Refitting for changing applications, which requires in each case a different type of microscope upright or inverted is either impossible altogether, or is possible only at disproportionately high expense.

Based on this state of the art, the object of the invention is to further develop a telecentric modular zoom system of the kind described above in such a way that when using interchangeable objectives and when varying the magnification with these objectives, telecentricity is ensured over the entire zoom range and, given a constant object-image distance, a variation in magnification (ratio of image size to object size), caused by an axial adjustment of the optical assemblies, is continuously possible.

This object is achieved according to the invention by the features of claim 1. Advantageous embodiments are specified in the subclaims 2 to 22.

In this arrangement a physical aperture conjugated relative to the rear focal points of the objectives used and having a variable diameter may be arranged in the beam path, whereby the rear focal points of the objective may be mapped in the space between a sensor image and an intermediate image, and the intermediate image, the images of the rear focal points of the objective and the sensor image do not lie within or migrate through the lens group.

The diameter of the image plane (sensor plane) in such case is ≥11 mm.

Furthermore, the minimum distance between the of the aperture plane on the objective side and the first vertex of the lens group configured as a tube lens unit is ≥25 mm.

The zoom system according to the invention enables magnifications with the zoom factors 10×0.5–5, and 8×0.5–3.2.

The scope of application lies in the visual spectral range of 436 nm to 644 nm.

The aperture is advantageously axially movable and is variable in diameter.

The following relation applies to the aperture in the aperture plane:

$$\text{diameter of aperture min} \geq \text{diameter of aperture max}/3,$$

in which the diameter of the aperture min is set at a magnification min and the diameter of the aperture max is set at a magnification max.

The refractive power distributions and movement characteristics allow images to be mapped completely within an air space and therefore physically over the zoom range.

In a first advantageous embodiment having four optical assemblies, the invention, starting on the object side, consists of:
- a tube lens unit as a first fixed assembly
- a second movable assembly having positive refractive power,
- a movable intermediate image,
- a third movable assembly having positive refractive power,
- a movable aperture and
- a fourth fixed assembly having positive refractive power.

This variant is especially suitable for a telecentric zoom with an iris aperture m and coaxial reflected light.

The infinite space between aperture plane and first lens and the ratio of aperture chamber/aperture diameter >1.5 allows a beam splitter and other elements necessary for contrasting to be integrated. The low maximum beam inclination (arc tangent (½*11)/164.5*0.5))<4° in this space prevents any adverse effect by the components. There are two possible designs, one with an iris at the point of the aperture BLE for objectives having a rear focal point behind the objective and one with an iris at the conjugated point BL for objectives having a rear focal point inside the objective.

The mapping on a camera of relatively short design occurs at a low beam inclination. The conjugated aperture plane is accessible for the indicated physical aperture and the virtual aperture located in the microscope objective.

The maximum aperture diameter in this variant embodiment is 20 mm.

In a second advantageous embodiment having 5 optical assemblies, the invention, starting on the object side, consists of
- a tube lens unit as a first fixed assembly,
- a field lens as a second movable intermediate assembly,
- a movable intermediate image,
- a third movable assembly having positive refractive power,
- a movable aperture,
- a fourth moveable assembly having positive refractive power and
- a fifth fixed assembly having negative refractive power.

In a third advantageous embodiment having five optical assemblies, the invention, starting on the object side, consists of:

a tube lens unit as a first fixed assembly,
a field lens as a second fixed assembly,
a fixed intermediate image,
a third movable assembly having positive refractive power,
a movable aperture,
a fourth movable assembly having positive refractive power and
a fifth movable assembly having negative refractive power.

In a fourth advantageous embodiment having five optical assemblies, the invention, starting on the object side, consists of:
a tube lens unit as a first fixed assembly,
a field lens as a second fixed assembly,
a fixed intermediate image,
a third movable assembly having positive refractive power,
an aperture, which is coupled to
a fourth movable assembly having positive refractive power and
a fifth fixed assembly having negative refractive power.

In a fifth advantageous embodiment having seven optical assemblies, the invention, starting on the object side, consists of:
a tube lens unit as a first fixed assembly,
a fixed field lens,
a fixed intermediate image,
another fixed field lens,
a second movable assembly having positive refractive power,
a movable aperture which is coupled to a third movable assembly having positive refractive power,
a fourth movable assembly having positive refractive power and
a field lens as a fifth fixed assembly.

In a sixth advantageous embodiment having six optical assemblies, the invention, starting on the object side, consists of:
a tube lens unit as a first fixed assembly,
a field lens as a second fixed assembly,
a fixed intermediate image,
a field lens as a third fixed assembly,
a fourth movable assembly having positive refractive power,
a movable aperture, which is to [sic]
a fifth movable assembly having positive refractive power, and
a sixth movable assembly having negative refractive power.

In a seventh advantageous embodiment having five optical assemblies, the invention, starting on the object side, consists of:
a tube lens unit as a first fixed assembly,
a field lens as a second fixed assembly,
a fixed intermediate image,
a fixed field lens,
a third, two-part movable assembly having positive refractive power,
a movable aperture and
a fourth movable assembly having negative refractive power.

In an eighth advantageous embodiment having six optical assemblies, the invention, starting on the object side, consists of:
a tube lens unit as a first fixed assembly,
a second movable assembly having negative refractive power,
a movable intermediate image,
a third movable assembly having negative refractive power,
a fourth movable assembly having positive refractive power,
a fifth fixed assembly having positive refractive power,
a fixed aperture and
a sixth fixed assembly having positive refractive power.

This variant having the fixed apertures after the zoom means the exit pupil is in a constant position and creates favorable opportunities for coupling to the following optics such as, for example, a laser scanning assembly. The aperture plane is suitable for coupling axial incident light to a constant light guidance factor and for pupil interferences.

The modular zoom system according to the invention is described in more precise detail below with reference to several examples. In the related drawings.

Figure 1:
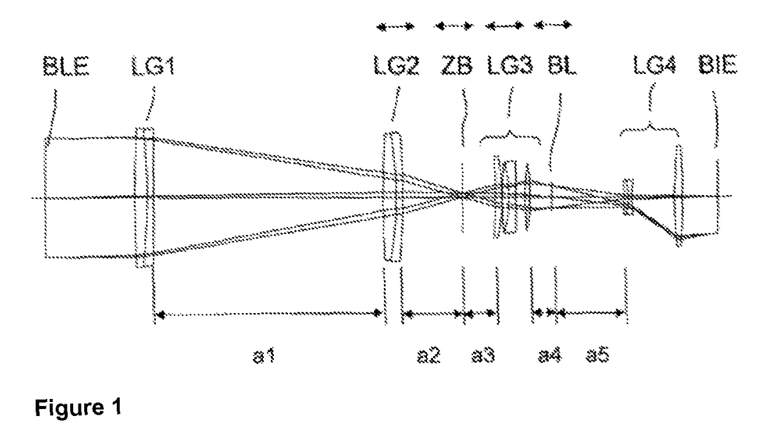
FIG. 1: shows a first variant embodiment having four optical assemblies and an overall length of 265.7 mm.

The zoom system according to the invention shown in FIG. 1 comprises four optical assemblies LG1, LG2, LG3 and LG4 at an overall length of 265.7 mm and has the following system data, the overall length in all examples being defined as the distance between the first lens vertex of the first lens group LG1 (tube lens unit) and the image plane BIE:

| Optical assembly | Radius r (mm) | Thickness d (mm) | Distance a (mm) | Refractive index $n_e$ | Abbe No. $v_e$ |
|---|---|---|---|---|---|
| LG1 | infinite | | | | |
| | 72.338 | 40.50 | | 1.49846 | 62.00 |
| | −39.524 | 5.60 | | 1.56082 | 41.0 |

-continued

| Optical assembly | Radius r (mm) | Thickness d (mm) | Distance a (mm) | Refractive index $n_e$ | Abbe No. $v_e$ |
|---|---|---|---|---|---|
| | −613.122 | 3.00 | | | |
| | | | a1 | | |
| LG2 | 67.313 | 6.00 | | 1.49846 | 62.0 |
| | −22.548 | 3.00 | | 1.79196 | 35.7 |
| | −41.269 | | | | |
| | | | a2 | | |
| | infinite | | | | |
| | | | a3 | | |
| LGE3 | −39.524 | 3.00 | | 1.79192 | 18.7 |
| | −13.724 | 0.10 | | 1.49846 | 62.0 |
| | 23.376 | 3.20 | | 1.91048 | 23.1 |
| | −8.786 | 3.00 | | 1.49846 | 62.0 |
| | 150.560 | 4.25 | | | |
| | 20.834 | 2.30 | | | |
| | −14.539 | | | | |
| | | | a4 | | |
| | infinite | | | | |
| | | | a5 | | |
| LG4 | −6.541 | 2.00 | | 1.88815 | 30.5 |
| | −4.157 | 1.50 | | 1.49846 | 62.0 |
| | 5.309 | 20.19 | | 1.62508 | 40.2 |
| | 31.395 | 3.90 | | | |
| | −31.395 | 15.62 | | | |
| | infinite | | | | |

Starting from the object side, i.e. from the aperture plane BLE, the zoom system is characterized by the fixed optical assembly LG1 (tube lens unit), the movable assembly LG2, a movable intermediate image ZB, the movable assembly LG3, a movable aperture BL, the fixed assembly LG4 and the image plane (sensor plane) BIE.

Figure 2:
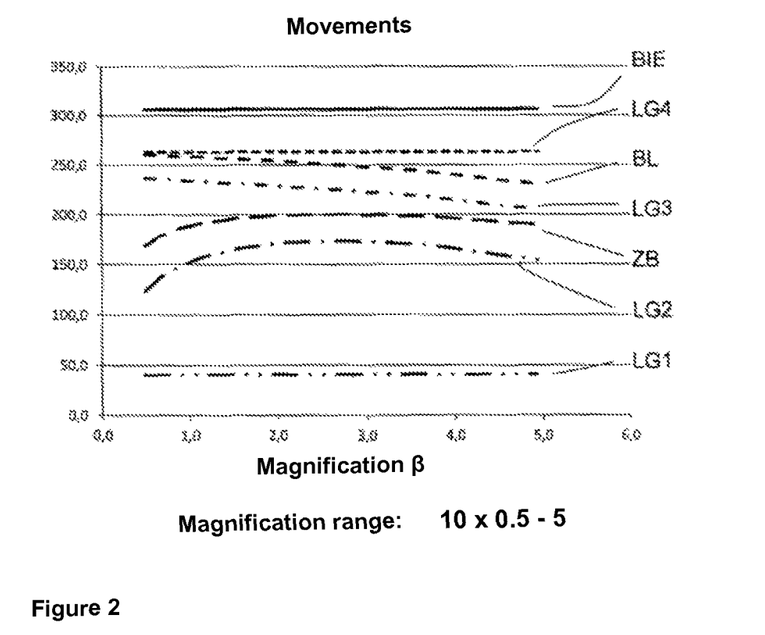
FIG. 2: shows a representation of the movement characteristics of the zoom system from FIG. 1, FIG. 3: shows a second variant embodiment having five optical assemblies and an overall length of 267.5 mm.

The movement characteristics of the zoom system from FIG. 1 may be seen in FIG. 2. From this it is apparent that the initial value of magnification is at 0.5 and the end value at 5. Selected magnifications β result from the following distance settings:

| | Magnifications β | | |
|---|---|---|---|
| | 4.9 | 1.6 | 0.5 |
| a1 | 104.97 | 116.96 | 74.54 |
| a2 | 26.74 | 21.56 | 35.9 |
| a3 | 15.21 | 34.48 | 68.44 |
| a4 | 9.72 | 8.98 | 7.95 |
| a5 | 32.45 | 7.2 | 2.25 |

In this case, the magnification β is equal to the focal length zoom/focal length of a reference tube lens (164.5 mm).

Figure 3:
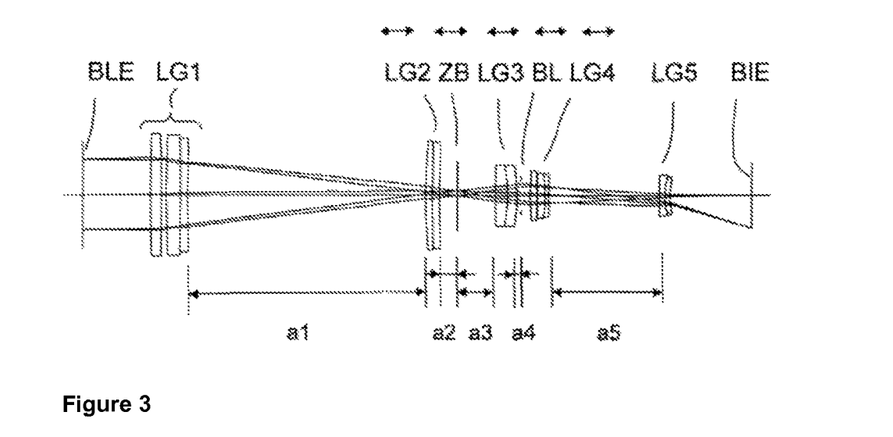

The zoom system according to the invention in FIG. 3 comprises five optical assemblies LG1, LG2, LG3, LG4 and LG5 at an overall length of 267.5 mm, and has the following system data:

| Optical assembly | Radius r (mm) | Thickness d (mm) | Distance a (mm) | Refractive index $n_e$ | Abbe No. $v_e$ |
|---|---|---|---|---|---|
| | infinite | | | | |
| LG1 | 117.770 | 30.00 | | 1.60953 | 65.00 |
| | −631.361 | 5.00 | | 1.61772 | 58.60 |
| | 70.650 | 2.00 | | 1.75453 | 35.1 |
| | −193.072 | 6.39 | | | |
| | 102.636 | 3.16 | | | |
| | | | a1 | | |

-continued

| Optical assembly | Radius r (mm) | Thickness d (mm) | Distance a (mm) | Refractive index $n_e$ | Abbe No. $v_e$ |
|---|---|---|---|---|---|
| LG2 | 33.881 | 3.00 | | 1.80832 | 46.2 |
| | 101.374 | 3.22 | | 1.72308 | 29.4 |
| | 103.896 | | | | |
| | | | a2 | | |
| | infinite | | | | |
| | | | a3 | | |
| LGE3 | 68.849 | 5.50 | | 1.48908 | 70.8 |
| | −10.848 | 4.00 | | 1.81198 | 25.2 |
| | −18.072 | | | | |
| | | | a4 | | |
| | infinite | | | | |
| LG4 | 25.00 | 3.89 | | 1.65391 | 55.6 |
| | −47.928 | 3.00 | | 1.59446 | 68.0 |
| | −79.206 | 0.20 | | 1.73444 | 33.2 |
| | −11.330 | 3.50 | | | |
| | −69.802 | 1.40 | | | |
| | | | a5 | | |
| LG5 | 135.299 | 2.50 | | 1.50489 | 80.1 |
| | 5.273 | 2.40 | | 1.72308 | 29.4 |
| | 6.863 | 37.05 | | | |
| | infinite | | | | |

Starting from the object side, i.e. the image plane BLE, the zoom system is characterized by the fixed optical assembly LG1 (tube lens unit), the movable assembly LG2 (field lens unit), a movable intermediate image ZB, the movable assembly LG3, a movable aperture BL, the movable assembly LG4, the fixed assembly LG5 and the image plane (sensor plane) BIE.

Figure 4:
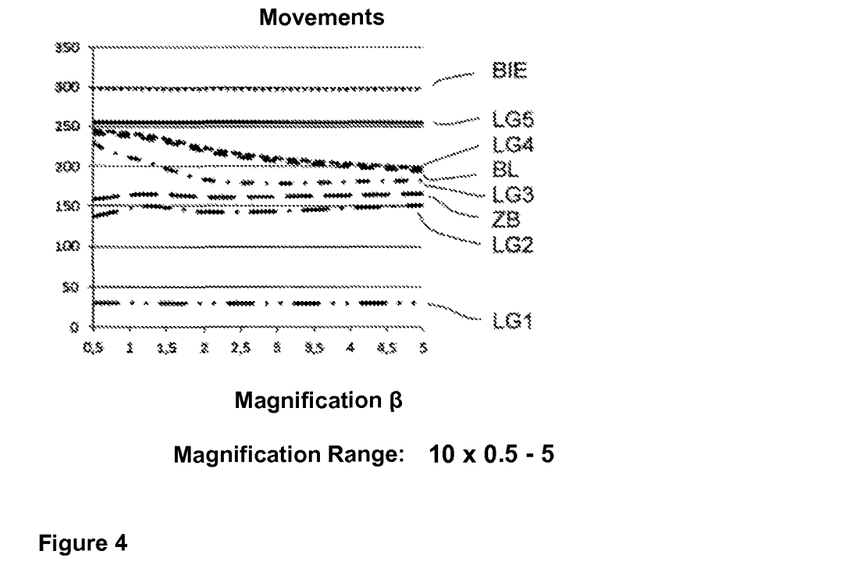
FIG. 4: shows a representation of the movement characteristics of the zoom system from FIG. 3, FIG. 5: shows a third variant embodiment having five optical assemblies and an overall length of 263.2 mm.

The movement characteristics of the zoom system from FIG. 3 may be seen in FIG. 4. From this it is apparent that the initial value of magnification is 0.5 and the end value is 5. Selected magnifications β result from the following distance settings:

| | Magnifications β | | |
|---|---|---|---|
| | 5.0 | 1.6 | 0.5 |
| a1 | 105.14 | 101.82 | 90.76 |
| a2 | 8.00 | 9.78 | 15.30 |
| a3 | 16.89 | 30.65 | 71.11 |
| a4 | 1.95 | 24.63 | 1.96 |
| a5 | 49.27 | 14.37 | 2.11 |

In this case, the magnification β is equal to the focal length zoom/focal length of a reference tube lens (164.5 mm).

Figure 5:
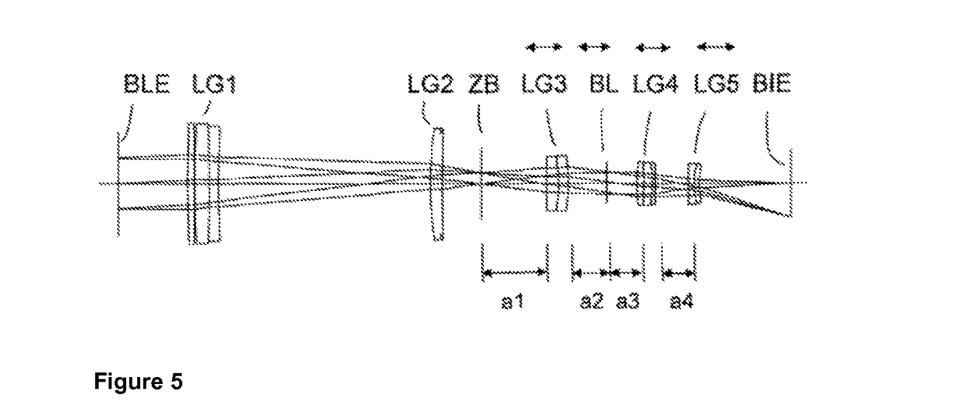

The zoom system according to the invention in FIG. 5 comprises five optical assemblies LG1, LG2, LG3, LG4 and LG5 with an overall length of 263 mm and has the following system data:

| Optical assembly | Radius r (mm) | Thickness d (mm) | Distance a (mm) | Refractive index $n_e$ | Abbe No. $v_e$ |
|---|---|---|---|---|---|
| | infinite | | | | |
| LG1 | 116.897 | 30.00 | | 1.59446 | 68.00 |
| LG2 | −725.247 | 3.00 | | 1.62287 | 60.1 |
| | 70.851 | 0.10 | | 1.75453 | 35.1 |
| | −167.515 | 6.31 | | 1.80832 | 46.2 |
| | 104.937 | 4.00 | | 1.80832 | 46.2 |
| | 34.830 | 91.45 | | | |
| | 118.649 | 5.00 | | | |
| | 118.649 | 0.00 | | | |

-continued

| Optical assembly | Radius r (mm) | Thickness d (mm) | Distance a (mm) | Refractive index $n_e$ | Abbe No. $v_e$ |
|---|---|---|---|---|---|
| | infinite | 17.01 | | | |
| | | | a1 | | |
| LG3 | 60.146 | 5.50 | | 1.48914 | 70.2 |
| | −10.573 | 4.00 | | 1.79192 | 25.5 |
| | −17.689 | | | | |
| | | | a2 | | |
| | infinite | | | | |
| LG4 | 26.057 | 3.75 | | 1.65391 | 55.68 |
| | −47960 | 3.00 | | 1.81198 | 25.2 |
| | −83.227 | 0.20 | | 1.62033 | 63.0 |
| | −12.42 | 3.50 | | | |
| | −75.028 | 1.40 | | | |
| | | | a3 | | |
| LG5 | 376.580 | 2.50 | | 1.53019 | 76.6 |
| | 5.533 | 2.40 | | 1.70442 | 29.9 |
| | 7.561 | | | | |
| | | | a4 | | |
| | infinite | | | | |

Starting from the object side, i.e. the image plane BLE, the zoom system is characterized by the fixed optical assembly LG1 (tube lens unit), the fixed assembly LG2, a fixed intermediate image ZB, the movable assembly LG3, a movable aperture BL, the movable assembly LG4, the movable assembly LG5 and the image plane (sensor plane) BIE.

Figure 6:
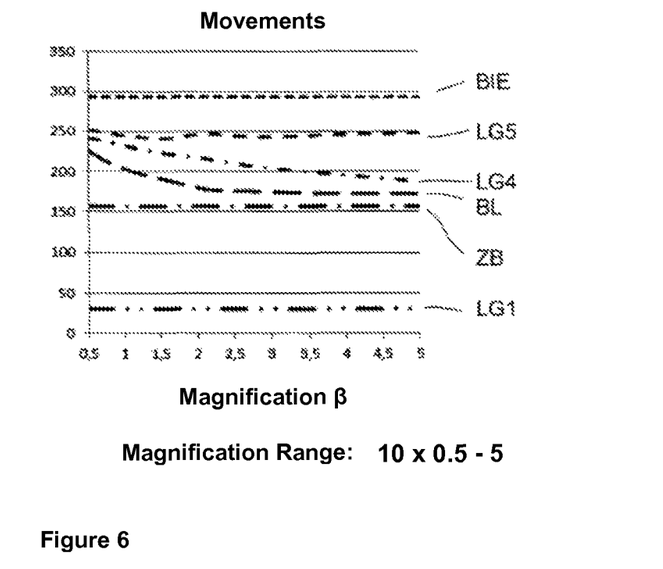
FIG. 6: shows a representation of the movement characteristics of the zoom system from FIG. 5, FIG. 7: shows a fifth variant embodiment having five optical assemblies and an overall length of 270.5 mm.

The movement characteristics of the zoom system from FIG. 5 may be seen in FIG. 6. From this it is apparent that the initial value of magnification is 0.5 and the end value is 5. Selected magnifications β result from the following distance settings:

| | Magnifications β | | |
|---|---|---|---|
| | 5.0 | 1.6 | 0.5 |
| a1 | 15.60 | 32.01 | 69.63 |
| a2 | 1.96 | 20.06 | 2.09 |
| a3 | 52.83 | 11.10 | 1.98 |
| a4 | 39.70 | 46.92 | 36.39 |

In this case, the magnification β is equal to the focal length zoom/focal length of a reference tube lens (164.5 mm).

Figure 7:
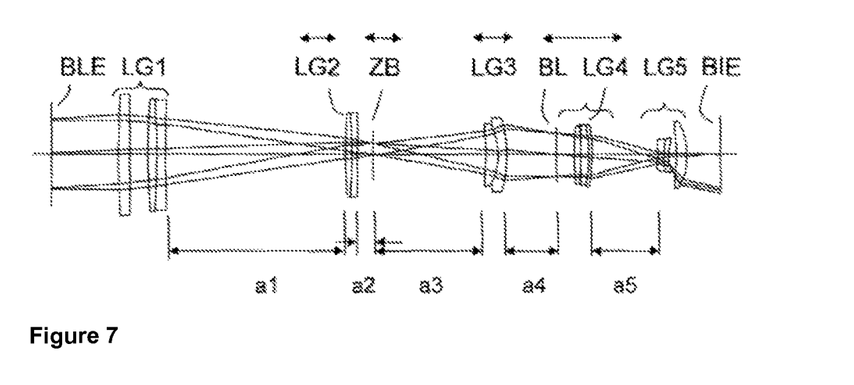

The zoom system according to the invention in FIG. 7 comprises five optical assemblies LG1, LG2, LG3, LG4 and LG5 with an overall length of 270.5 mm, and has the following system data:

| Optical assembly | Radius r (mm) | Thickness d (mm) | Distance a (mm) | Refractive index $n_e$ | Abbe No. $v_e$ |
|---|---|---|---|---|---|
| | infinite | | | | |
| LG1 | 79.935 | 30.00 | | 1.64129 | 55.1 |
| | 453.839 | 4.99 | | 1.60993 | 56.5 |
| | 63.509 | 8.13 | | 1.72734 | 29.1 |
| | −72.554 | 3.95 | | | |
| | 128.318 | 3.67 | | | |
| | | | a1 | | |
| LG2 | 40.024 | 3.01 | | 1.60548 | 60.4 |
| | −61.338 | 2.50 | | 1.72308 | 29.4 |
| | −183.687 | | | | |
| | | | a2 | | |
| | infinite | | | | |

-continued

| Optical assembly | Radius r (mm) | Thickness d (mm) | Distance a (mm) | Refractive index $n_e$ | Abbe No. $v_e$ |
|---|---|---|---|---|---|
| | | | a3 | | |
| LGE3 | −26.675 | 5.50 | | 1.52458 | 59.6 |
| | −6.396 | 4.00 | | 1.74705 | 27.6 |
| | −11.314 | | | | |
| | | | a4 | | |
| | infinite | | | | |
| LG4 | 20.624 | 8.0 | | 1.69401 | 54.6 |
| | 52.570 | 3.00 | | 1.60548 | 60.4 |
| | −14.330 | 0.20 | | | |
| | −11.075 | 3.50 | | | |
| | −14.560 | 1.40 | | | |
| | | | a5 | | |
| LG5 | −7.089 | 2.50 | | 1.64254 | 59.9 |
| | 4.144 | 2.40 | | 1.58482 | 40.5 |
| | 4.307 | 4.08 | | 1.71615 | 53.6 |
| | −11.311 | 5.00 | | | |
| | −6.741 | 15.00 | | | |
| | infinite | | | | |

Starting from the object side, i.e. the image plane BLE, the zoom system is characterized by the fixed optical assembly LG1 (tube lens unit), the movable assembly LG2 (field lens), a movable intermediate image ZB, the movable assembly LG3, a movable aperture BL, coupled to the movable assembly LG4, the fixed assembly LG5 and the image plane (sensor plane) BIE.

Figure 8:
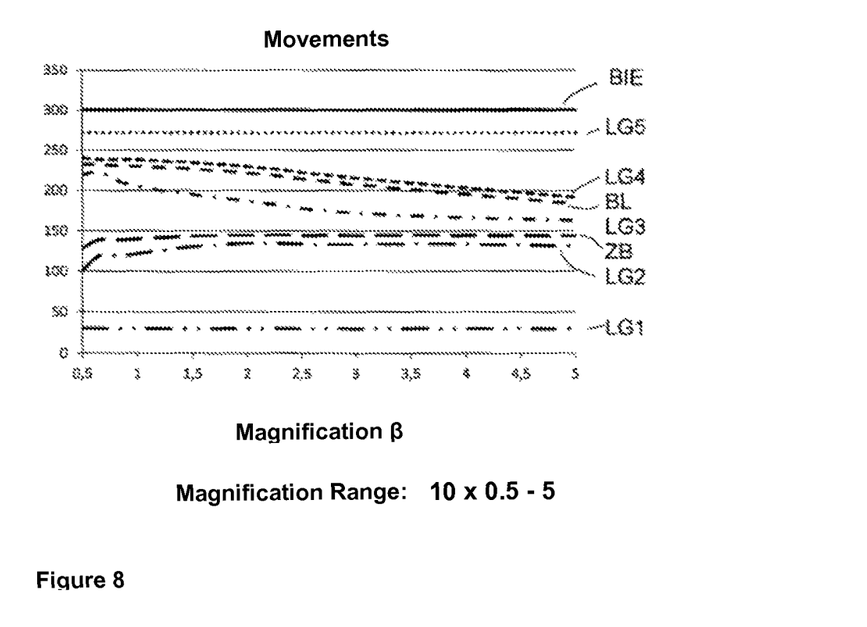
FIG. 8: shows a representation of the movement characteristics of the zoom system from FIG. 7, FIG. 9: shows a sixth variant embodiment having seven optical assemblies and an overall length of 275.9 mm.

The movement characteristics of the zoom system from FIG. 7 may be seen in FIG. 8. From this it is apparent that the initial value of magnification is 0.5 and the end value is 5. Selected magnifications β result from the following distance settings:

| | Magnifications β | | |
|---|---|---|---|
| | 5.0 | 2.1 | 0.5 |
| a1 | 80.53 | 84.24 | 50.00 |
| a2 | 7.10 | 4.34 | 21.76 |
| a3 | 18.96 | 40.30 | 90.90 |
| a4 | 11.28 | 25.76 | 3.50 |
| a5 | 71.83 | 35.07 | 23.57 |

In this case, the magnification β is equal to the focal length zoom/focal length of a reference tube lens (164.5 mm).

Figure 9:
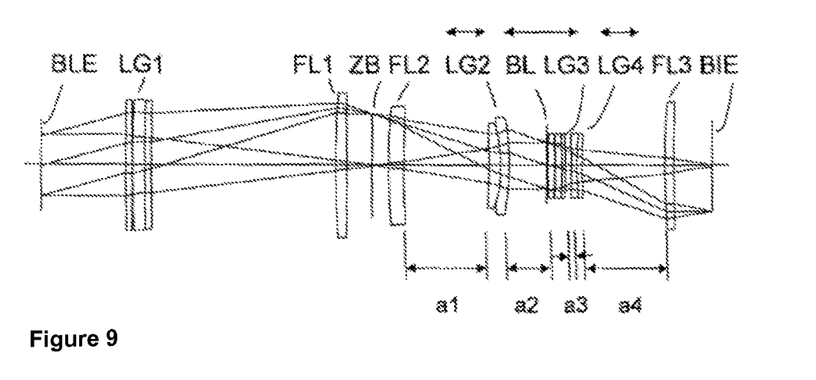

The zoom system according to the invention in FIG. 9 comprises five optical assemblies LG1, LG2, LG3, LG4 and LG5 with an overall length of 275.9 mm, and has the following system data: (5)

| Optical assembly | Radius r (mm) | Thickness d (mm) | Distance a (mm) | Refractive index $n_e$ | Abbe No. $v_e$ |
|---|---|---|---|---|---|
| | infinite | | | | |
| LG1 | 103.284 | 40.00 | | 1.64129 | 55.1 |
| | infinite | 3.00 | | | |
| | 68.139 | 0.10 | | 1.60993 | 56.5 |
| | 320.174 | 5.83 | | 1.72734 | 29.1 |
| | 96.388 | 2.83 | | | |
| | | 86.25 | | | |
| FL1 | 43.375 | 5.00 | | 1.60548 | 60.4 |
| | infinite | | | | |
| | | 11.88 | | | |
| | infinite | | | | |
| FL2 | 28.769 | 8.00 | | 1.71615 | 53.6 |

-continued

| Optical assembly | Radius r (mm) | Thickness d (mm) | Distance a (mm) | Refractive index $n_e$ | Abbe No. $v_e$ |
|---|---|---|---|---|---|
| | 30.987 | 7.00 | | | |
| | | | a1 | | |
| LG2 | −24.118 | 5.50 | | 1.52458 | 59.6 |
| | −7.252 | 4.00 | | 1.74705 | 27.6 |
| | −13.018 | | | | |
| | | | a2 | | |
| | infinite | | | | |
| LG3 | 39.995 | 0.00 | | 1.69401 | 54.6 |
| | 101.112 | 3.00 | | 1.60548 | 60.4 |
| | −18.526 | 3.50 | | 1.72794 | 37.7 |
| | −68.916 | 1.40 | | | |
| | | | a3 | | |
| LG4 | −25.498 | 2.40 | | 1.58482 | 40.5 |
| | 14.272 | 2.50 | | 1.64254 | 59.9 |
| | 30.101 | | | | |
| | | | a4 | | |
| FL3 | 29.436 | 5.00 | | 1.71615 | 53.6 |
| | 121.188 | 18.04 | | | |
| | infinite | | | | |

Starting from the object side, i.e. the image plane BLE, the zoom system is characterized by the fixed optical assembly LG1 (tube lens unit), a fixed field lens FL1, a fixed intermediate image ZB, a second fixed field lens FL2, the movable assembly LG2, a movable aperture BL, which is coupled to the movable assembly LG3, the movable assembly LG4, a fixed field lens FL3 and the image plane (sensor plane) BIE.

Figure 10:
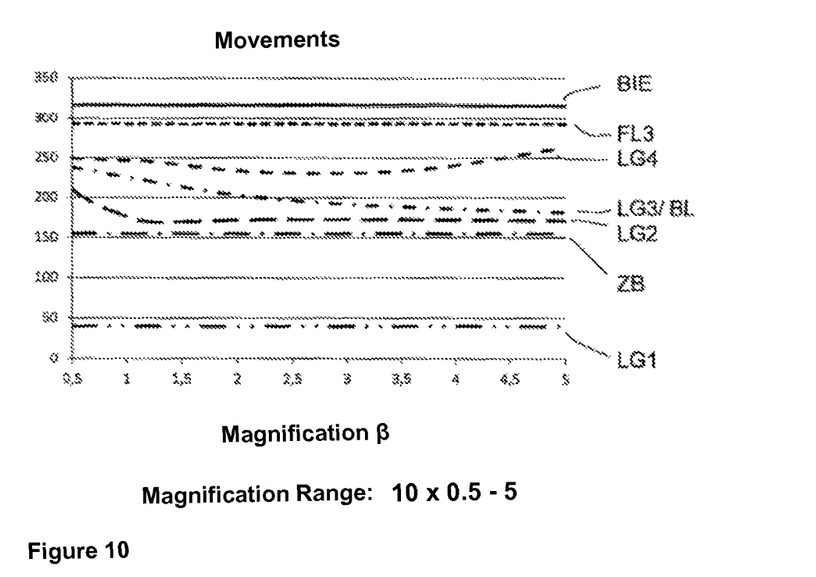
FIG. 10: shows a representation of the movement characteristics of the zoom system from FIG. 9, FIG. 11: shows a seventh variant embodiment having six optical assemblies and an overall length of 271.9 mm.

The movement characteristics of the zoom system from FIG. 9 may be seen in FIG. 10. From this it is apparent that the initial value of magnification is 0.5 and the end value is 5. Selected magnifications β result from the following distance settings:

| | Magnifications β | | |
|---|---|---|---|
| | 5.0 | 2.1 | 0.5 |
| a1 | 1.40 | 2.28 | 40.42 |
| a2 | 0.76 | 19.94 | 18.05 |
| a3 | 73.24 | 23.19 | 3.00 |
| a4 | 25.13 | 55.11 | 39.04 |

In this case, the magnification β is equal to the focal length zoom/focal length of a reference tube lens (164.5 mm).

Figure 11:
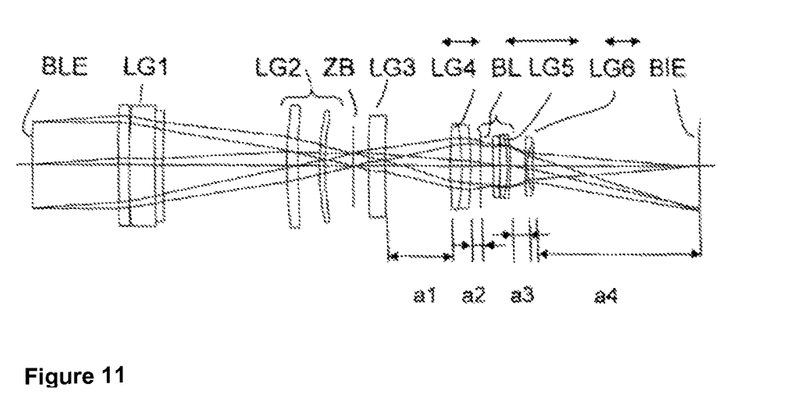

The zoom system according to the invention in FIG. 11 comprises six optical assemblies LG1, LG2, LG3, LG4, LG5 and LG6 with an overall length of 271.9 mm, and has the following system data:

| Optical assembly | Radius r (mm) | Thickness d (mm) | Distance a (mm) | Refractive index $n_e$ | Abbe No. $v_e$ |
|---|---|---|---|---|---|
| LG1 | infinite | | | | |
| | 124.814 | 40.00 | | 1.64129 | 55.1 |
| | −1022.388 | 5.00 | | 1.60993 | 56.5 |
| | 61.780 | 0.1 | | 1.727335 | 29.1 |
| | 228.980 | 11.65 | | | |
| | 79.432 | 3.92 | | | |
| | | | 57.57 | | |
| LG2 | 29.717 | 5.00 | | 1.60548 | 60.4 |
| | 50.289 | 10.00 | | 1.55979 | 62.6 |
| | 16.368 | 2.50 | | | |
| | 15.584 | 13.00 | | | |

-continued

| Optical assembly | Radius r (mm) | Thickness d (mm) | Distance a (mm) | Refractive index $n_e$ | Abbe No. $v_e$ |
|---|---|---|---|---|---|
| | infinite | | | | |
| LGE3 | 58.612 | 7.05 | | 1.71615 | 53.6 |
| | 855.983 | 8.00 | | | |
| | | | a1 | | |
| LG4 | 26.533 | 5.50 | | 1.52458 | 59.6 |
| | −12.663 | 4.00 | | 1.74705 | 27.6 |
| | −24.496 | | | | |
| | | | a2 | | |
| | infinite | | | | |
| LG5 | −36.808 | 3.00 | | 1.69401 | 54.6 |
| | −388.142 | 0.20 | | 1.60548 | 60.4 |
| | 57.534 | 3.50 | | 1.72794 | 37.7 |
| | −6.793 | 1.40 | | | |
| | −13.362 | | | | |
| | | | a3 | | |
| LG6 | −631.987 | 1.00 | | 1.64254 | 59.9 |
| | 4.272 | 2.40 | | 1.58482 | 40.5 |
| | 16.697 | | | | |
| | | | a4 | | |
| | infinite | | | | |

Starting from the object side, i.e. the image plane BLE, the zoom system is characterized by the fixed optical assembly LG1 (tube lens unit), the fixed assembly LG2 (field lens), a fixed intermediate image ZB, the fixed assembly LG3 (field lens), the movable assembly LG4, a movable aperture BL, which is coupled to the movable assembly LG5, the movable assembly LG6 and the image plane (sensor plane) BIE.

Figure 12:
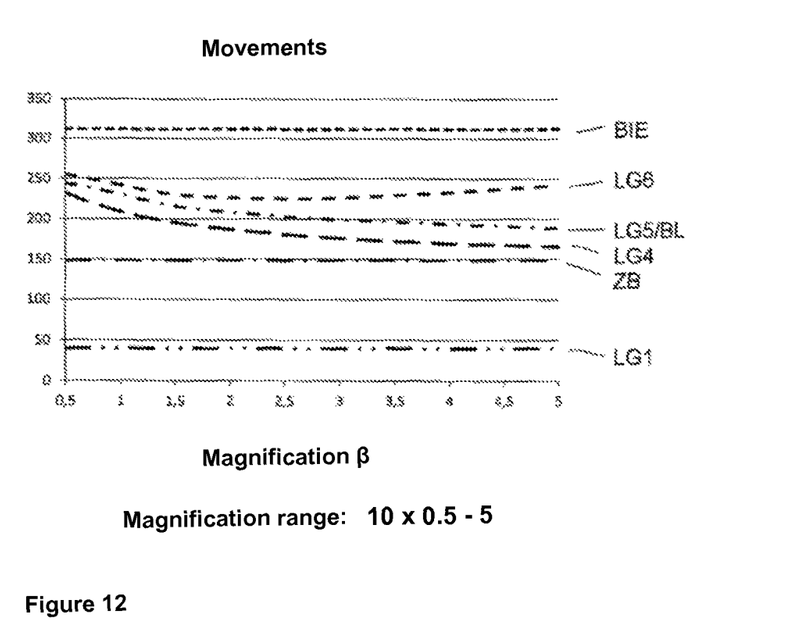
FIG. 12: shows a representation of the movement characteristics of the zoom system from FIG. 11, FIG. 13: shows an eighth variant embodiment having five optical assemblies and an overall length of 218.7 mm.

The movement characteristics of the zoom system from FIG. 11 may be seen in FIG. 12. From this it is apparent that the initial value of magnification is 0.5 and the end value is 5. Selected magnifications β result from the following distance settings:

| | Magnifications β | | |
|---|---|---|---|
| | 5.0 | 2.1 | 0.5 |
| a1 | 1.96 | 21.78 | 69.04 |
| a2 | 13.09 | 12.11 | 1.51 |
| a3 | 45.44 | 10.70 | 3.43 |
| a4 | 66.62 | 82.53 | 53.13 |

In this case, the magnification β is equal to the focal length zoom/focal length of a reference tube lens (164.5 mm).

Figure 13:
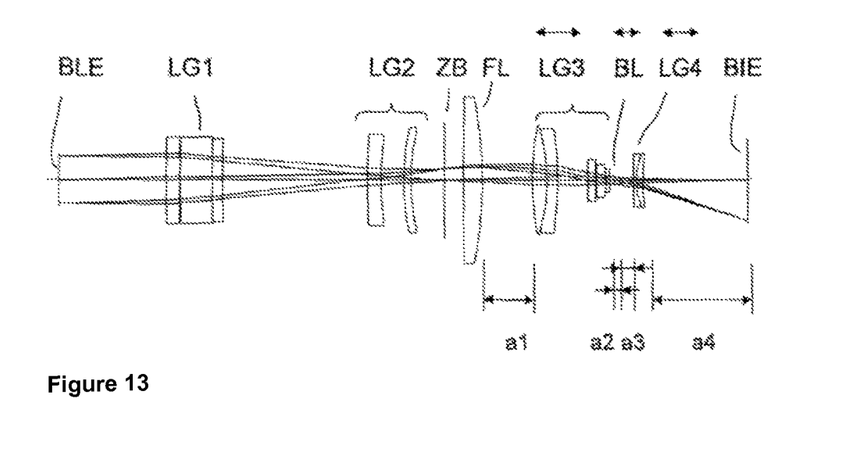

The zoom system according to the invention in FIG. 13 comprises four optical assemblies LG1, LG2, LG3 and LG4 with an overall length of 218.7 mm, and has the following system data:

| Optical assembly | Radius r (mm) | Thickness d (mm) | Distance a (mm) | Refractive index $n_e$ | Abbe No. $v_e$ |
|---|---|---|---|---|---|
| LG1 | infinite | | | | |
| | 110.262 | 40.00 | | 1.64129 | 55.1 |
| | −513.243 | 5.00 | | 1.60993 | 56.5 |
| | 57.237 | 0.10 | | 1.72734 | 29.1 |
| | 294.928 | 11.92 | | | |
| | 83.601 | 3.91 | | | |
| | | | 54.15 | | |
| LG2 | 67.194 | 5.00 | | 1.60548 | 60.4 |
| | 21.267 | 8.71 | | 1.54979 | 62.6 |
| | 19.259 | 2.50 | | | |

-continued

| Optical assembly | Radius r (mm) | Thickness d (mm) | Distance a (mm) | Refractive index $n_e$ | Abbe No. $v_e$ |
|---|---|---|---|---|---|
|  | 14.861 | 12.82 |  |  |  |
|  | infinite |  |  |  |  |
| FL | 220.437 | 7.05 |  |  |  |
|  | −31.479 | 7.00 |  | 1.71615 | 53.6 |
|  |  |  | a1 |  |  |
| LG3 | 20.441 | 5.50 |  | 1.52458 | 59.6 |
|  | −13.790 | 4.00 |  | 1.74705 | 27.6 |
|  | −26.190 | 11.37 |  | 1.69401 | 54.6 |
|  | −79.829 | 3.00 |  | 1.60548 | 60.4 |
|  | −54.002 | 0.02 |  | 1.72794 | 37.7 |
|  | 33.993 | 3.50 |  |  |  |
|  | −5.387 | 1.40 |  |  |  |
|  | −22.324 |  |  |  |  |
|  |  |  | a2 |  |  |
|  | infinite |  |  |  |  |
|  |  |  | a3 |  |  |
| LG4 | −175.155 | 1.00 |  | 1.64254 | 59.9 |
|  | 5.474 | 2.40 |  | 1.58482 | 40.5 |
|  | 17.519 |  |  |  |  |
|  |  |  | a4 |  |  |
|  | infinite |  |  |  |  |

Starting from the object side, i.e. the image plane BLE, the zoom system is characterized by the fixed optical assembly LG1 (tube lens unit), the fixed assembly LG2 (field lens), a fixed intermediate image ZB, a fixed field lens FL, the two-part movable assembly LG3, a movable aperture BL, the movable assembly LG4 and the image plane (sensor plane) BIE.

Figure 14:
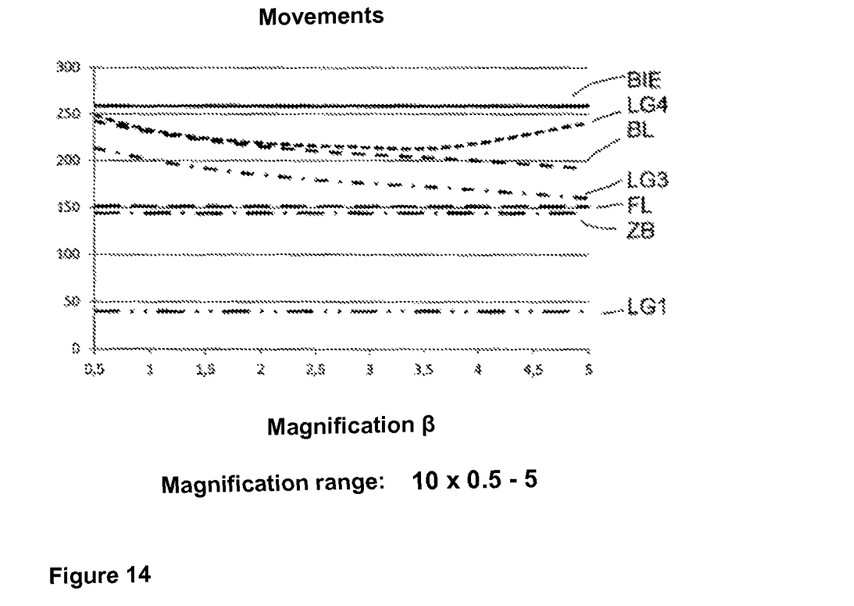
FIG. 14: shows a representation of the movement characteristics of the zoom system from FIG. 13, FIG. 15: shows a ninth variant embodiment having six optical assemblies and an overall length of 408 mm.

The movement characteristics of the zoom system from FIG. 13 may be seen in FIG. 14. From this it is apparent that the initial value of magnification is 0.5 and the end value is 5. Selected magnifications β result from the following distance settings:

| | Magnifications β | | |
|---|---|---|---|
| | 5.0 | 2.1 | 0.5 |
| a1 | 2.05 | 25.44 | 55.31 |
| a2 | 2.41 | 1.60 | 0.00 |
| a3 | 48.81 | 3.93 | 6.89 |
| a4 | 14.86 | 37.16 | 5.92 |

In this case, the magnification β is equal to the focal length zoom/focal length of a reference tube lens (164.5 mm).

Figure 15:
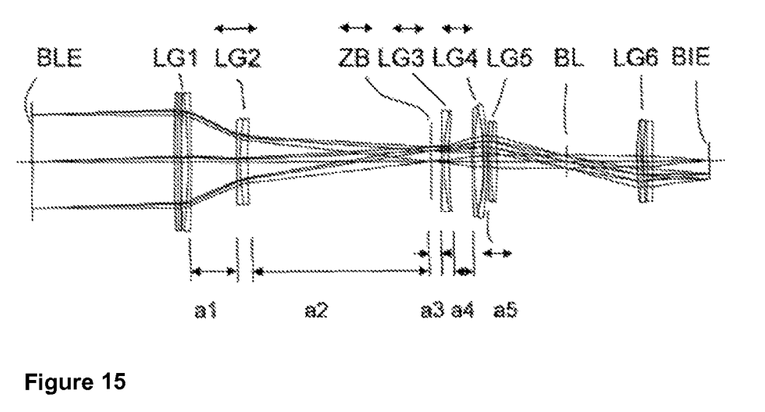

The zoom system according to the invention in FIG. 15 comprises four optical assemblies LG1, LG2, LG3, LG4, LG5 and LG6 with an overall length of 408 mm, and has the following system data:

| Optical assembly | Radius r (mm) | Thickness d (mm) | Distance a (mm) | Refractive index $n_e$ | Abbe No. $v_e$ |
|---|---|---|---|---|---|
|  | infinite |  |  |  |  |
| LG1 | 222.561 | 149.16 |  | 1.75453 | 35.1 |
|  | 161.018 | 3.00 |  | 1.44980 | 91.7 |
|  | −556.986 | 3.83 |  | 1.63278 | 60.0 |
|  | 140.455 | 0.10 |  | 1.72539 | 34.5 |
|  | −49.568 | 6.96 |  |  |  |
|  | −163.141 | 3.50 |  |  |  |
|  |  |  | a1 |  |  |
| LG2 | −131.216 | 3.00 |  | 1.61959 | 63.2 |
|  | 22.382 | 7.60 |  | 1.75453 | 35.1 |

-continued

| Optical assembly | Radius r (mm) | Thickness d (mm) | Distance a (mm) | Refractive index $n_e$ | Abbe No. $v_e$ |
|---|---|---|---|---|---|
|  | 46.569 |  |  |  |  |
|  |  |  | a2 |  |  |
|  | infinite |  |  |  |  |
|  |  |  | a3 |  |  |
| LG3 | −215.551 | 2.50 |  | 1.52588 | 51.3 |
|  | 21.260 | 5.00 |  | 1.75453 | 35.1 |
|  | 42.016 |  |  |  |  |
|  |  |  | a4 |  |  |
| LGE4 | 97.570 | 1.80 |  | 1.75453 | 35.1 |
|  | 33.275 | 9.61 |  | 1.59204 | 67.90 |
|  | −22.369 | 1.08 |  | 1.64132 | 42.2 |
|  | −20.548 | 2.90 |  |  |  |
|  | −32.943 |  |  |  |  |
|  |  |  | a5 |  |  |
| LG5 | −335.686 | 2.50 |  | 1.64132 | 42.2 |
|  | 28.517 | 6.00 |  | 1.65391 | 55.6 |
|  | −107.617 | 73.02 |  |  |  |
|  | infinite |  |  |  |  |
| LG6 | 33.236 | 74.01 |  | 1.49854 | 81.1 |
|  | −135.362 | 4.42 |  | 1.48914 | 70.2 |
|  | 25.583 | 1.80 |  | 1.59204 | 67.9 |
|  | 30.217 | 0.10 |  | 1.70055 | 36.1 |
|  | −111.651 | 5.00 |  |  |  |
|  | 630.246 | 62.08 |  |  |  |
|  | infinite |  |  |  |  |

Starting from the object side, i.e. the image plane BLE, the zoom system is characterized by the fixed optical assembly LG1 (tube lens unit), the movable assembly LG2, a movable intermediate image ZB, the movable assembly LG3, the movable assembly LG4, the fixed assembly LG5, a fixed aperture BL, the fixed assembly LG6 and the image plane (sensor plane) BIE.

Figure 16:
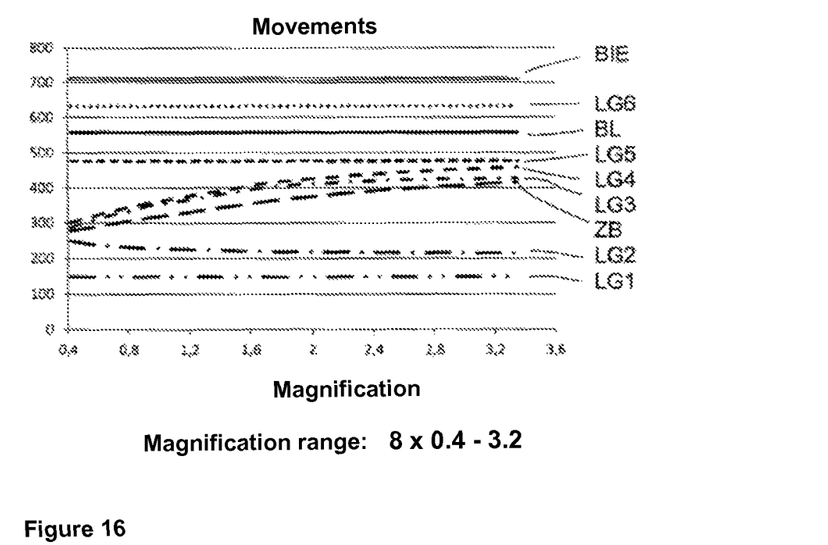
FIG. 16: shows a representation of the movement characteristics of the zoom system from FIG. 15.

The movement characteristics of the zoom system from FIG. 15 may be seen in FIG. 16. From this it is apparent that the initial value of magnification is 0.5 and the end value is 5. Selected magnifications β result from the following distance settings:

| | Magnifications β | | |
|---|---|---|---|
| | 3.3 | 0.9 | 0.4 |
| a1 | 47.88 | 62.94 | 83.49 |
| a2 | 191.15 | 71.56 | 16.90 |
| a3 | 10.90 | 33.64 | 9.90 |
| a4 | 24.47 | 1.57 | 6.22 |
| a5 | 1.66 | 106.34 | 159.54 |

In this case, the magnification β is equal to the focal length zoom/focal length of a reference tube lens (164.5 mm).

LIST OF REFERENCE NUMERALS

BLE aperture plane
BL aperture
ZB intermediate image
BIE image plane (sensor plane)
LG1 to LG7 optical assembly
FL field lens
β magnification
a1 to a5 distance (mm)
r radius (mm)
d thickness (mm)
$v_e$ Abbe number $n_e$ refractive index for 546.07 nm, nF' refractive index for 479.99 nm, nC' refractive index for 643.84 nm ve=(ne1)/nF'−nC')

The invention claimed is:

1. A telecentric module zoom system for mapping an object plane on a sensor in a digital transmitted light microscope or incident light microscope having interchangeable lenses, comprising:
    a fixed tube lens unit (LG1) and a plurality of optical assemblies (LG2, LG3, LG4, LG5, LG6, LG7), at least two of which are adjustably arranged relative to one another for the purpose of changing the magnification,
    wherein a physical aperture (BL) conjugated relative to rear focal points of objectives used and having a variable diameter is arranged in the beam path,
    wherein the rear focal points of an objective are mapped in the space between a sensor image (BIE) and an intermediate image (ZB); and the intermediate image (ZB), the images of the rear focal points of the objectives and the sensor image (BIE) do not lie within or migrate through the plurality of optical assembles (LG2, LG3, LG4, LG5, LG6, LG7), and
    wherein the aperture (BL) is axially movable,
    wherein the plurality of optical assemblies comprises four optical assemblies (LG1, LG2, LG3, LG4), an intermediate image (ZB) and an aperture (BL), wherein, starting from the object side of the aperture plane (BLE),
    a tube lens unit as a first fixed assembly (LG1),
    second movable assembly (LG2) having positive refractive power,
    a movable intermediate image (ZB)
    a third movable group (LG3) having positive refractive power,
    a movable aperture (BL) and
    a fourth fixed assembly (LG4) having positive refractive power are implemented.

2. The telecentric modular zoom system according to claim 1,
    wherein the aperture (BL) moves conjugate relative to the rear focal points of the objective depending on the position thereof.

3. The telecentric modular zoom system according to claim 1,
    wherein the following relation applies to the aperture (BLE):

diameter aperture min≥diameter aperture max/3, wherein the diameter of the aperture min is set at a magnification (β) min and the diameter of the aperture max is set at a magnification (β) max.

4. The telecentric modular zoom system according to claim 1,
    wherein the maximum aperture diameter in the aperture plane (BLE) at a maximum magnification (β) equals 20 mm.

5. A telecentric module zoom system for mapping an object plane on a sensor in a digital transmitted light microscope or incident light microscope having interchangeable lenses, comprising:
    a fixed tube lens unit (LG1) and a plurality of optical assemblies (LG2, LG3, LG4, LG5, LG6, LG7), at least two of which are adjustably arranged relative to one another for the purpose of changing the magnification,
    wherein a physical aperture (BL) conjugated relative to rear focal points of objectives used and having a variable diameter is arranged in the beam path,
    wherein the rear focal points of an objective are mapped in the space between a sensor image (BIE) and an intermediate image (ZB); and the intermediate image (ZB), the images of the rear focal points of the objectives and the sensor image (BIE) do not lie within or migrate through the plurality of optical assembles (LG2, LG3, LG4, LG5, LG6, LG7), and
    wherein the aperture (BL) is axially movable,
    wherein the plurality of optical assemblies comprises five optical assemblies (LG1, LG2, LG3, LG4, LG5), an intermediate image (ZB) and an aperture (BL), wherein, starting from the object side of the aperture plane (BLE),
    a tube lens unit as a first fixed assembly (LG1),
    a field lens as a second movable assembly (LG2),
    a movable intermediate image (ZB),
    a third movable assembly (LG3) having positive refractive power,
    a movable aperture (BL),
    a fourth movable assembly (LG4) having positive refractive power and
    a fifth fixed assembly (LG5) having negative refractive power are implemented.

6. A telecentric module zoom system for mapping an object plane on a sensor in a digital transmitted light microscope or incident light microscope having interchangeable lenses, comprising:
    a fixed tube lens unit (LG1) and a plurality of optical assemblies (LG2, LG3, LG4, LG5, LG6, LG7), at least two of which are adjustably arranged relative to one another for the purpose of changing the magnification,
    wherein a physical aperture (BL) conjugated relative to rear focal points of objectives used and having a variable diameter is arranged in the beam path,
    wherein the rear focal points of an objective are mapped in the space between a sensor image (BIE) and an intermediate image (ZB); and the intermediate image (ZB), the images of the rear focal points of the objectives and the sensor image (BIE) do not lie within or migrate through the plurality of optical assembles (LG2, LG3, LG4, LG5, LG6, LG7), and
    wherein the aperture (BL) is axially movable,
    wherein the plurality of optical assemblies comprises five optical assemblies (LG1, LG2, LG3, LG4, LG5), an intermediate image (ZB) and an aperture (BL), wherein, starting from the aperture plane (BLE) on the object side,
    a tube lens unit as a first fixed assembly (LG1),
    a field lens as a second fixed assembly (LG2),
    a fixed intermediate image (ZB),
    a third movable assembly (LG3) having positive refractive power,
    a movable aperture (BL),
    a fourth movable assembly (LG4) having positive refractive power, and
    a fifth movable assembly (LG5) having negative refractive power are implemented.

* * * * *